US007850936B2

United States Patent
Levasseur et al.

(10) Patent No.: US 7,850,936 B2
(45) Date of Patent: Dec. 14, 2010

(54) DRY SULFUR DIOXIDE ($SO_2$) SCRUBBING

(75) Inventors: Armand A. Levasseur, Windsor Locks, CT (US); George D. Mylchreest, Simsbury, CT (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 12/371,705

(22) Filed: Feb. 16, 2009

(65) Prior Publication Data

US 2009/0208397 A1    Aug. 20, 2009

Related U.S. Application Data

(60) Provisional application No. 61/029,388, filed on Feb. 18, 2008.

(51) Int. Cl.
*B01D 53/50* (2006.01)
*B01D 53/74* (2006.01)

(52) U.S. Cl. .......................... 423/244.01; 423/244.07; 422/168; 422/177

(58) Field of Classification Search ............ 423/244.01, 423/244.07; 422/168, 177
See application file for complete search history.

(56) References Cited

U.S. PATENT DOCUMENTS 4,792,440 A * 12/1988 Nielsen et al. ......... 423/244.07
5,464,597 A * 11/1995 Tang .......................... 423/210
6,325,985 B1 * 12/2001 Koskinen et al. ......... 423/239.1
2006/0228281 A1    10/2006 Ströder et al.

FOREIGN PATENT DOCUMENTS

DE  198 13 286    9/1999
EP  1 815 903    8/2007
WO  WO 96/16722    6/1996

OTHER PUBLICATIONS

PCT International Search Report and The Written Opinion of the International Searching Authority dated Jun. 5, 2009—(PCT/US2009/034274).
Gambin A et al., "Dry Treatment of Flue Gas in the Glass Industry Using Lime Based Sorbents", Verre, Institut Du Verre, Paris FR, Environnement & Recyclage, vol. 13, No. 1, pp. 28-31, Feb. 1, 2007, XP-001510446.

* cited by examiner

*Primary Examiner*—Timothy C Vanoy
(74) *Attorney, Agent, or Firm*—Robert D. Crawford

(57) ABSTRACT

A system for removing sulfur dioxide ($SO_2$) from $SO_2$ laden flue gas resulting from the burning of fossil fuel, includes an absorber and first and second separators. The absorber captures $SO_2$ from a flow of the $SO_2$ laden flue gas with a sorbent. The first separator separates a first portion of the sorbent with captured $SO_2$ both from a second portion of the sorbent with captured $SO_2$ and from the flue gas. The second separator separates the second portion of sorbent from the flue gas.

20 Claims, 3 Drawing Sheets

DRY SULFUR DIOXIDE (SO$_2$) SCRUBBING

RELATED APPLICATIONS

This application claims priority to copending U.S. provisional application entitled "IMPROVED DRY SULFUR DIOXIDE (SO$_2$) SCRUBBING" having Ser. No. U.S. 61/029,388, filed Feb. 18, 2008 which is entirely incorporated herein by reference.

FIELD OF THE INVENTION

The present invention relates generally to fossil fuel fired heat generating systems that produce heat and sulfur dioxide (SO$_2$) laden flue gas. More particularly, the present invention relates dry scrubbers for removing SO$_2$ from the SO$_2$ laden flue gas produced by such heat generating systems.

BACKGROUND OF THE INVENTION

Heat generating systems with furnaces for firing fossil fuels have long been employed to generate controlled heat, with the objective of doing useful work. The work might be in the form of direct work, as with kilns, or might be in the form of indirect work, as with steam generators for industrial or marine applications or for driving turbines that produce electric power. During the combustion process, the sulfur in the fuel is oxidized to form SO$_2$, which is exhausted in the flue gas leaving the furnace An air pollution control (APC) subsystem is conventionally used to remove SO$_2$ and other so called pollutants, such as NO$_x$ and particulate matter including flyash, from SO$_2$ laden flue gas produced by such heat generating systems. Conventionally, the flue gas exhausted from the furnace of a coal fired heat generation system is directed to the APC subsystem. Commonly the flue gas entering the APC subsystem is directed to APC components, each of which can be considered a system in its own right, in order remove the SO$_2$ and other so called pollutants from the flue gas. For example, the flue gas may be processed via a selective catalytic reduction (SCR) system (not shown) to remove NO$_x$ and via a dry or semi-dry SO$_2$ scrubber system, such as a flash dryer absorber (FDA), to remove SO$_2$ and particulate matter.

FIG. 1 depicts an FDA 10 for scrubbing SO$_2$ from the flue gas produced in the burning of fossil fuel. As shown, the SO$_2$ laden flue gas 12 is processed by an absorber tower 14 to capture the SO$_2$ in the SO$_2$ laden flue gas. As will be understood by those skilled in the art, the SO$_2$ in the flue gas has a high acid concentration. Accordingly, to capture the SO$_2$, the absorber tower 14 creates an environment in which the SO$_2$ laden flue gas is placed in contact, under the proper conditions, with material having a higher pH level than that of the flue gas in order to capture, i.e. absorb, the SO$_2$ from the SO$_2$ laden flue gas, so that a desulfurization of the flue gas will occur. To accomplish this, the residual content of calcium oxide (CaO), which is commonly referred to as lime, in the flyash within the flue gas can be used as the sorbent. Accordingly, during processing, conditions are established in the absorber tower 14 such that the SO$_2$ in the SO$_2$ laden flue gas 12 is absorbed by the residual CaO in the flyash. This transforms the residual CaO into calcium sulfite CaSO$_3$, which is basically a salt.

The flue gas 12$a$, which includes the flyash with the transformed sorbent, is exhausted from the absorber tower 14 to a baghouse 16 or alternatively an electrostatic precipitator (ESP) (not shown). The baghouse 16 is shown with an air slide bottom 18. The baghouse 16 functions to separate the flyash from the flue gas 12$a$, to thereby remove the flyash with the absorbed SO$_2$ from the flue gas 12$c$ that flows downstream of the baghouse. From the baghouse 16, the flue gas 12$c$ can, if desired, be directed to downstream processing equipment (not shown), but will ultimately be directed to an exhaust stack (also not shown). Beneficially, at least a portion of the separated flyash 12$b$ is directed from the baghouse 16, via a feeder 20, depicted as a rotary feeder, driven by motor 22, for recycling. The feeder 20 directs the flyash 12$b$ to a hydrator 25, depicted as including a mixer 24 driven by motor 26, where it is partially hydrated, i.e. humidified, with water (H$_2$O), before being recycled back, via hydrated stream 28 to the absorber tower 14. It will be recognized that fresh lime may also be added to the flyash in the mixer to maintain an appropriate pH of the recycled flyash entering the absorber. Any non-recycled flyash is directed from the baghouse 16 via waste stream 30 to a flyash disposal area 32.

It is generally recognized that increasing the humidity of the and flue gas in the absorber tower 14 will improve the efficiency at which the recycled flyash captures the SO$_2$ from the SO$_2$ laden flue gas. However, conventionally, the maximum relative humidity of the stream 28 entering the absorber tower 14 is maintained within a range of forty percent (40%) to fifty percent (50%) in order to avoid flyash handling problems, binding in the baghouse 16 or ESP (not shown), and cold spot condensation problems, even though this might be lower than the humidity level which would be most preferred from the standpoint of efficient capture of the SO$_2$.

In summary, conventionally the SO$_2$ within the SO$_2$ laden flue gas is absorbed by the flyash in an absorber tower. The flyash with absorbed SO$_2$ is then separated from the flue gas by a baghouse or ESP, and at least a part of the separated fly ash is feed to a hydrator and rehydrated to a less than desirable humidity level for SO$_2$ capture, before being recycled back to the absorber tower.

Accordingly, a need exists for a technique that will facilitate capturing and removing SO$_2$ from SO$_2$ laden flue gasses, without the limitations of conventional techniques.

OBJECTS OF THE INVENTION

Accordingly, it is an objective of the present invention to provide a technique for more efficiently capturing and removing SO$_2$ from SO$_2$ laden flue gasses.

It is another objective of the present invention to provide a technique for capturing and removing SO$_2$ from SO$_2$ laden flue gasses with a sorbent having a high relative humidity.

Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the invention, a system for removing sulfur dioxide (SO$_2$) from SO$_2$ laden flue gas resulting from the burning of fossil fuel, for example from the burning of coal in a furnace, includes an absorber and first and second separators.

The absorber, which could for example take the form of what is often characterized as a reactor or absorber tower, is configured to capture $SO_2$ from a flow of the $SO_2$ laden flue gas with a sorbent. More particularly, the absorber is configured to provide an environment and to direct the $SO_2$ laden flue gas and the sorbent in a manner that induces the capture of $SO_2$. Such a configuration is well understood in the art. The flow of the $SO_2$ laden flue gas will typically include flyash, and the flyash may in turn include the sorbent, such as calcium oxide (CaO), that will be used to capture the $SO_2$. Preferably, the relative humidity of the sorbent in the absorber is greater than 50%. The capture of the $SO_2$ from the flow of the $SO_2$ laden flue gas by the sorbent may, for example, transform the CaO, which is commonly referred to as lime, into calcium sulfite ($CaSO_3$).

The first separator, which is preferably a cyclone type separator, is configured to receive flue gas and separate out a portion of the sorbent with the captured $SO_2$.

The second separator, which is preferably either a baghouse or electrostatic precipitator type separator, is configured to separate the second portion of sorbent from the flue gas.

Beneficially the sorbent with captured $SO_2$ is separated such that an average size of sorbent particles in the first portion of sorbent is larger than an average size of sorbent particles in a second portion of sorbent. Furthermore, it may be particularly beneficial that the first separator is able to process flue gases having a average relative humidity higher than the second separator.

In accordance with aspects of the invention, the absorber includes (i) an absorber inlet for receiving the flow of $SO_2$ laden flue gas, and (ii) an absorber outlet for directing the flue gas and the sorbent with the captured $SO_2$ from the absorber. The first separator includes (i) a first separator inlet for receiving the flue gas and the sorbent directed from the absorber, (ii) a first separator flue gas outlet for directing the flue gas and the second portion of sorbent from the first separator, and (iii) a first separator sorbent outlet for directing the first portion of sorbent from the first separator. The second separator includes (i) a second separator inlet, for receiving the flue gas and the second portion of sorbent directed from the first separator, (ii) a second separator flue gas outlet for directing the flue gas from the second separator, and (iii) a second separator sorbent outlet for directing the second portion of sorbent from the second separator.

Beneficially, the system includes a hydrator, which could take the form of a tank and mixer, configured to rehydrate the first portion of sorbent directed from the first separator. It will be recognized that the first portion of sorbent will have a particular chemical composition. If desired, the hydrator can be further configured to combine the first portion of sorbent with a material having a different chemical composition. For example, the first portion of sorbent might be combined with a different type sorbent, e.g. hydrated fresh lime, or an additive, e.g. activated carbon, by the hydrator.

According to other aspects of the invention, the hydrator includes an outlet for directing the rehydrated sorbent to the absorber. The hydrator may also be further configured to also rehydrate the second portion of sorbent directed from the second separator.

Optionally, the system may include a reheater configured to heat the flue gas and the second portion of sorbent. If so, the reheater heats the flue gas and the second portion of sorbent directed from the first separator. The reheater has a third outlet for directing the heated flue gas and the heated second portion of sorbent from the reheater to the second separator. Thus, in such an implementation, the second portion of sorbent and the flue gas separated by the second separator are the heated second portion of sorbent and the heated flue gas directed from the reheater.

ENABLING DESCRIPTION OF A PREFERRED EMBODIMENT

Figure 1:
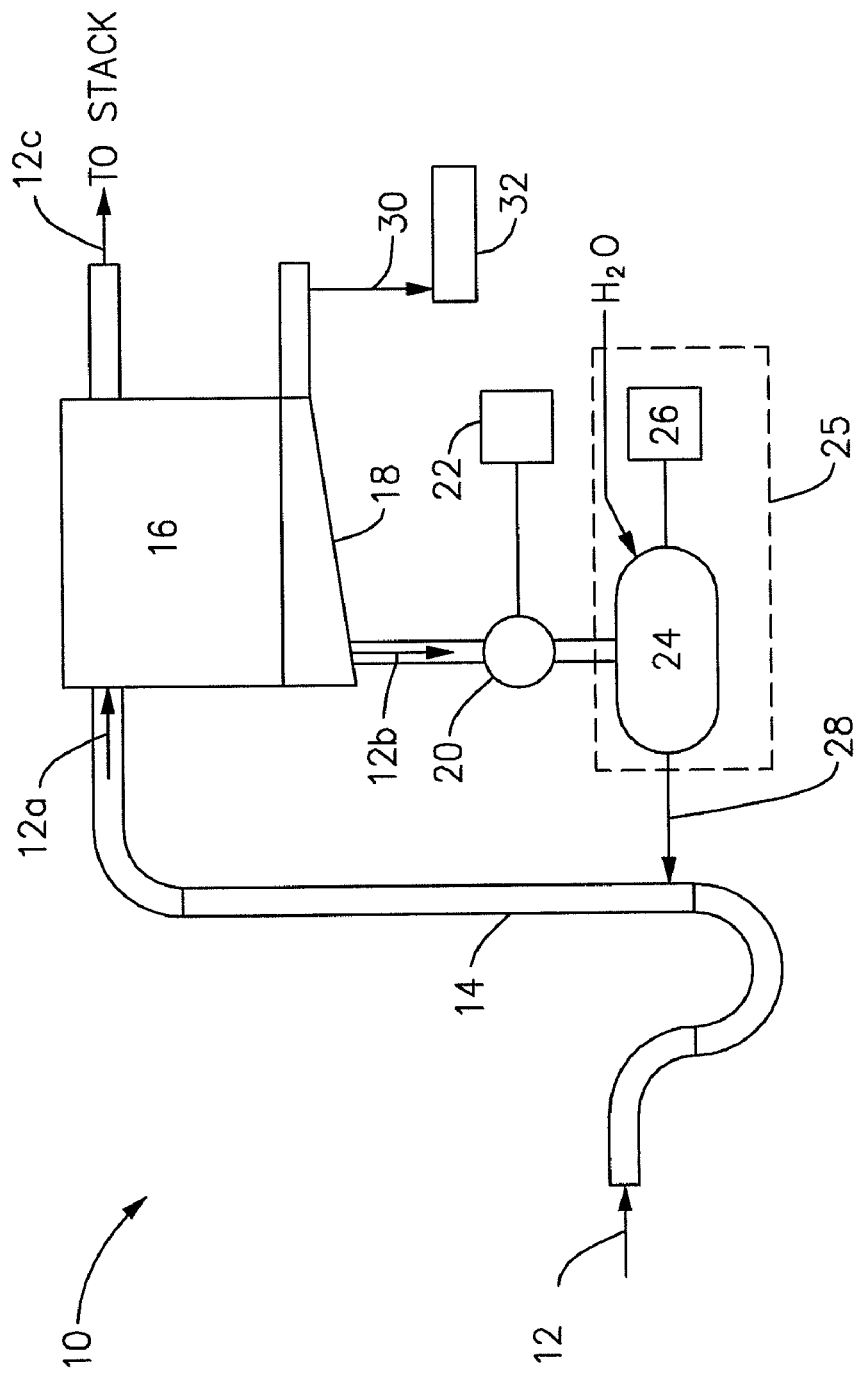
FIG. 1 depicts a conventional $SO_2$ removal system configuration, including an flash dry absorber (FDA) for capturing and removing $SO_2$ from $SO_2$ laden flue gas exhausted from a furnace of a fossil fuel fired heat generating system.
Figure 2:
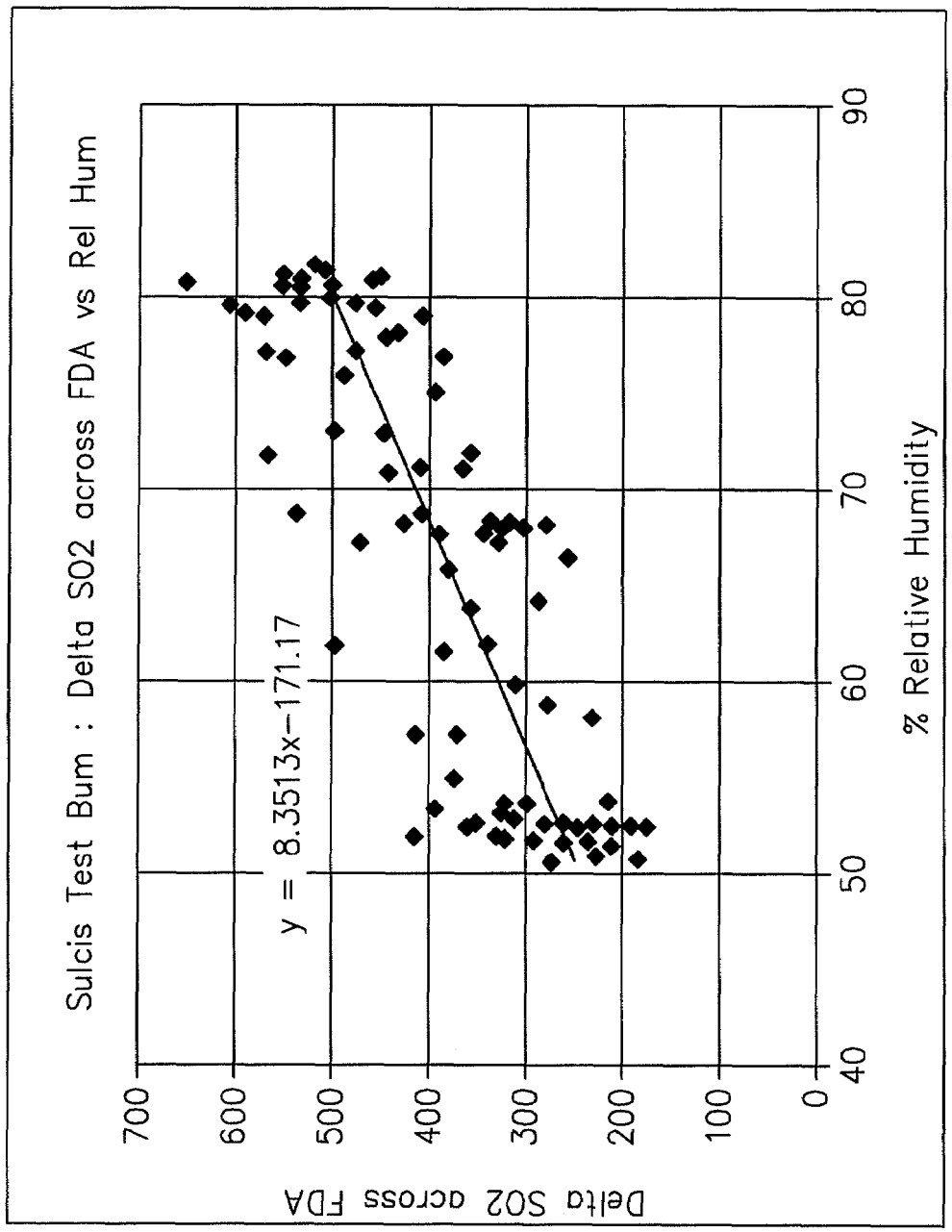
FIG. 2 is a graph depicting the effect of the relative humidity of a sorbent on the efficiency of the absorption of $SO_2$ from $SO_2$ laden flue gas exhausted from a furnace of a fossil fuel fired heat generating system.

Before describing a preferred embodiment of the invention, we refer to FIG. 2, which is a graph depicting data from testing performed with a conventional flash dry absorber (FDA). While the graph will be self explanatory to those skilled in the art, it is perhaps worthwhile to highlight that, as evidenced by the test results, if the relative humidity of the flue gas and sorbent can be increased above the 50% level, the overall $SO_2$ capture performance can be increased dramatically. Furthermore, testing has shown that more than 95% of the sulfur capture reaction in a conventional FDA, and hence the capture of $SO_2$ from $SO_2$ laden flue gas exhausted from a furnace of a fossil fuel fired heat generating system, occurs in the absorber tower, with little if any capture occurring in the baghouse or ESP.

Figure 3:
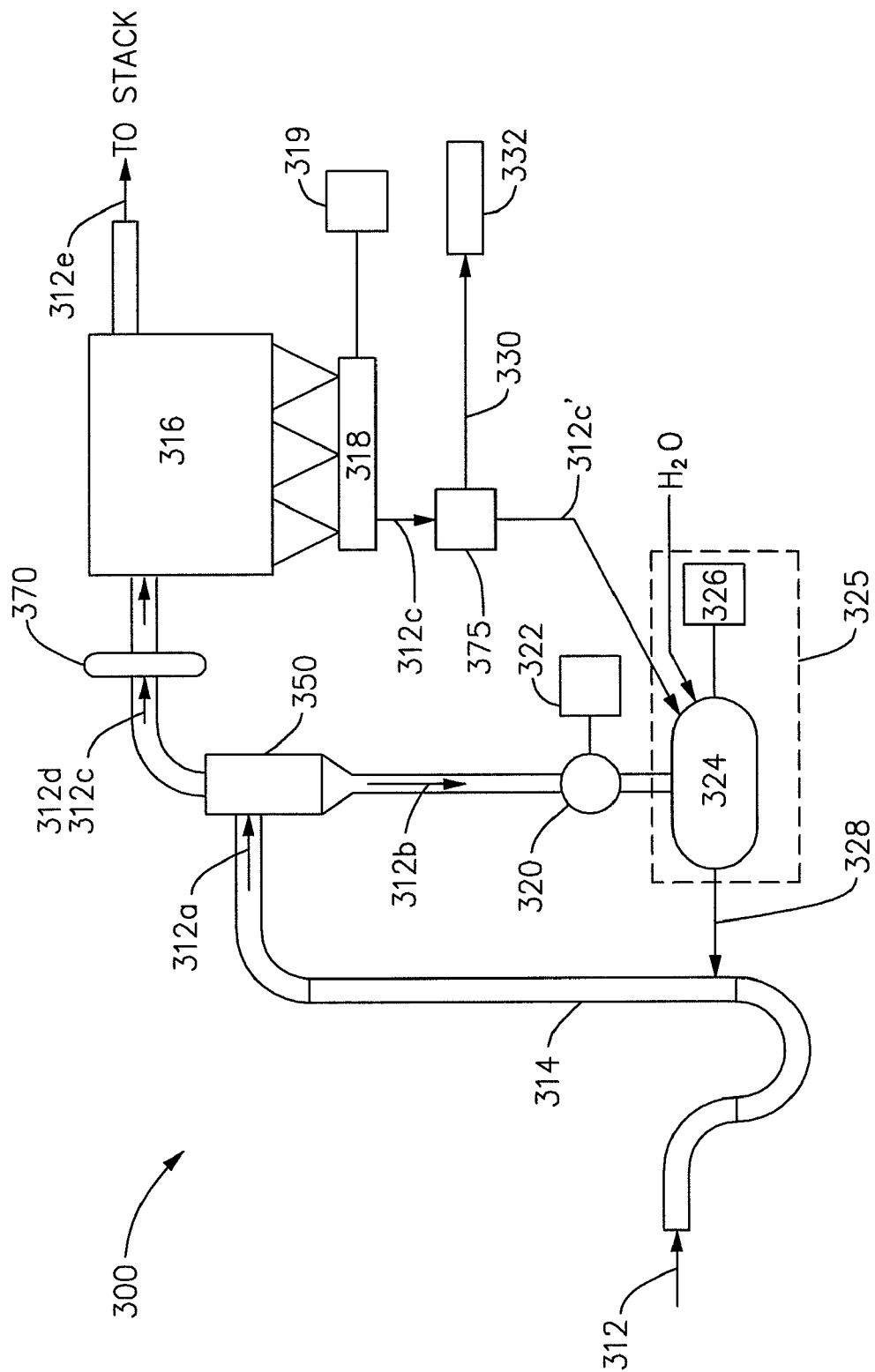
FIG. 3 depicts a $SO_2$ removal system configuration, including a FDA for capturing and removing $SO_2$ from $SO_2$ laden flue gas exhausted from a furnace of a fossil fuel fired heat generating system, in accordance with the present invention.

FIG. 3 depicts FDA 300 in accordance with an embodiment of the present invention. The FDA 300 can itself be considered a system, i.e. an FDA system. However, in a larger context, the FDA 300 could also be considered a component of an air pollution control (APC) subsystem of a heat generating system, when implemented to remove $SO_2$ from $SO_2$ laden flue gas produced by such a heat generating system. As noted above, the flue gas entering the APC subsystem may have been directed to one or more other APC components upstream of the FDA 300. For example, the flue gas may have been processed by a selective catalytic reduction (SCR) component of the APC subsystem (not shown) to remove $NO_x$ prior to being directed to the FDA 300. Furthermore, the flue gas leaving the FDA 300 may be directed to one or more other APC components downstream of the FDA for further processing before being exhausted from an exhaust stack.

As shown in FIG. 3, a flow of $SO_2$ laden flue gas 312 is received via an absorber inlet and processed by the absorber tower 314 to capture the $SO_2$ in the $SO_2$ laden flue gas. As will be understood by those skilled in the art, the $SO_2$ in the flue gas 312 has a high acid concentration. Accordingly, to capture the $SO_2$, the absorber tower 314 creates an environment in which the $SO_2$ laden flue gas 312 is placed in contact, under the proper conditions, with sorbent having a higher pH level than that of the flue gas in order to capture, i.e. absorb, the $SO_2$ from the $SO_2$ laden flue gas, so that a desulfurization of the flue gas 312 will occur. To accomplish this in the implementation being described, the residual content of calcium oxide (CaO), which is commonly referred to as lime, in the flyash within the flue gas 312 is used as the sorbent, although this is not mandatory and it should be understood that a different sorbent could conjunctively or alternatively be used.

During processing, conditions are established in the absorber tower 314 such that the $SO_2$ in the $SO_2$ laden flue gas 312 is absorbed by the residual CaO in the flyash. This transforms the residual CaO into calcium sulfite $CaSO_3$, which is basically a salt. To enhance the efficiency of the absorption, the relative humidity of flue gas and flyash, and hence the sorbent, in the absorber tower 314 is maintained at over 50% relative humidity. It will be understood from FIG. 2 that the greater the relative humidity of the flue gas and flyash, and thus the sorbent, above the 50% threshold, the more efficient the capture of the $SO_2$ by the sorbent and therefore the better the performance of the absorber tower 314. The flue gas 312$a$, which includes the flyash with the transformed sorbent, is exhausted from the absorber tower 314 via an absorber outlet to a first separator 350.

The first separator 350 is preferably a mechanical separator such as the cyclone, as shown in FIG. 3, although this is not mandatory and another type separator could be utilized. The first separator 350 functions to receive the flue gas 312$a$ via an inlet and to separate one portion of the flyash in the flue gas 312$a$ both from another portion of the flyash in the flue gas 312$a$ and from the flue gas itself. The one portion will be referred to as a first portion 312$b$ and has particles of a larger average particle size and greater average relative humidity, while the other portion will be referred to as a second portion 312$c$ and has particles of a smaller average particle size, e.g. fines, and lower water content. By performing the separation, the first portion of flyash 312$b$, with the larger particles, is removed from the flue gas 312$d$ with the second portion of flyash 312$c$ that flows downstream from the first separator, thereby removing a portion of the flyash and captured $SO_2$ from the flue gas that flows from the first separator 350.

From the first separator 350, the flue gas 312$d$ with the second portion 312$c$ of flyash is directed downstream via first separator flue gas outlet to a second separator 316, which is preferably a baghouse, as shown in FIG. 3, or electrostatic precipitator (ESP) (not shown), but could alternatively be some other type of separator. The separated first portion of flyash 312$b$ is directed from the first separator 350, via a first separator sorbent outlet, to a feeder 320, depicted in FIG. 3 as a rotary feeder, driven by motor 322, for recycling. The feeder 320 directs the separated first portion of flyash 312$b$ to a hydrator 325, depicted as including a mixer 324 driven by motor 326, where it is partially hydrated, i.e. humidified, with water ($H_2O$), to ensure that the relative humidity in the absorber tower 314, i.e. of the combined flyash in the incoming flow of flue gas 312 and recycled flyash in the incoming flow of the hydrated flyash stream 328, will be at the desired level, which preferably exceeds 50% relative humidity. The first portion of flyash 312$b$ will be partially hydrated in the hydrator 325 with lower water content, before being directed from the hydrator 325 via a hydrator outlet in the recycled hydrated flyash stream 328 to the absorber tower 314.

Optionally, a reheater 370 is included in the FDA between the first separator 350 and the second separator 316 in order to control the relative humidity of the flue gas 312$d$ with the second portion of flyash 312$c$ that enters the second separator 316, via a second separator inlet. In this way, the flue gas 312$d$ with the second portion of flyash 312$c$ can be sufficiently heated to remove excess moisture before entering the second separator, should this be required to, for example, prevent bag binding, cold spot condensation or other related problems. If reheater 370 is included, the flue gas 312$d$ with the second portion of flyash 312$c$ directed from the first separator is received via a reheater inlet, heated, and then directed via a reheater outlet to the second separator inlet.

As shown in FIG. 3, the second separator 316 functions to separate the second portion of flyash 312$c$, which has the smaller particles with lower water content, from the flue gas 312$d$. This separation removes the vast majority, if not all, of the remainder of the flyash and captured $SO_2$ from the flue gas 312$e$ that is directed, via a second separator flue gas outlet, to flow downstream of the second separator 316. From the second separator 316, the separated flue gas 312$e$ may be directed to further downstream processing equipment (not shown) and is ultimately directed to an exhaust stack (also not shown). The separated second portion of flyash 312$c$ is directed, via a second separator sorbent outlet, to a screw conveyor bottom 318. It should be understood that an air slide bottom or some other form of bottom could be used in lieu of the screw conveyor bottom 318 driven by motor 319.

It may be beneficial to direct some of the separated second portion of flyash 312$c$ from the second separator 316 for recycling and some for disposal. If so, a diverter 375, which is depicted in FIG. 3 as a modulating diverter valve, can be included in the FDA 300. If recycling of the second portion of flyash 312$c$ along with the first portion of flyash 312$b$ is desired, the diverter 375 can be operated to direct all or part of the separated second portion of flyash, which is identified as flyash 312$c'$, to the hydrator 325, where it will be combined and partially hydrated with the first portion of flyash 312$b$, before being recycled back to the absorber tower 314, via the hydrated stream 328. It should be noted that the directing a small amount of fines from the second separator 316 to the hydrator 325 may be helpful in adjusting the particle size within the hydrated stream 328 being returned to the absorber tower 314. On the other hand, if recycling of all or part of the second portion of flyash 312$c$ is not desired, the diverter 375 can be operated to direct some or all of the separated second portion of flyash 312$c$ to a flyash disposal area 332 via waste stream 330.

It will be recognized that an alternative sorbent, such as fresh hydrated lime, and/or additives, such as activated carbon, could be added to the hydrated stream 328, if desired, for example, to maintain an appropriate pH of the recycled flyash entering the absorber tower 314. Thus, the first portion of flyash, which has a particular chemical composition, may be combined in the hydrator with a material having a different chemical composition.

As should be understood from the above, the present invention facilitates the use of sorbent with higher, e.g. over 50%, relative humidity and thus improved $SO_2$ capture efficiency, while avoiding flyash handling problems, binding in the baghouse or ESP, and cold spot condensation problems. Furthermore, if a baghouse is utilized for the second separator, the design requirements, such as air-to-cloth ratio and bag strength, can be relaxed considerably due to much lower, e.g. by a factor of up to 50, solids loading entering the baghouse, and therefore the cleaning cycles can also be reduced. Additionally, an air slide bottom is unnecessary on the baghouse.

While an embodiment(s) of our invention have been described, it will be appreciated that modifications thereof, some of which have been alluded to hereinabove, may still be readily made thereto by those skilled in the art. We, therefore, intend by the appended claims to cover the modifications alluded to herein as well as all the other modifications that fall within the true spirit and scope of our invention.

We claim:

1. A system for removing sulfur dioxide ($SO_2$) from $SO_2$ laden flue gas resulting from the burning of fossil fuel, comprising:

an absorber configured to capture $SO_2$ from a flow of the $SO_2$ laden flue gas with a sorbent;

a first separator configured to separate the sorbent with captured $SO_2$ into a first portion of sorbent and a second portion of sorbent and to also separate the first portion of sorbent from the flue gas; and a second separator configured to separate the second portion of sorbent from the flue gas, wherein the first separator includes a first outlet for directing the flue gas and the second portion of sorbent from the first separator, and a second outlet for directing the first portion of sorbent from the first separator, and further comprising:

a hydrator configured to rehydrate the first portion of sorbent directed from the first separator, and including a third outlet for directing the rehydrated sorbent to the absorber.

2. The system according to claim 1, wherein:

the second separator includes a fourth outlet for directing the flue gas from the second separator and a fifth outlet for directing the second portion of sorbent from the second separator; and the hydrator is further configured to also rehydrate the second portion of sorbent directed from the second separator.

3. The system according to claim 1, wherein:

the sorbent has a first chemical composition; and the hydrator is further configured to combine the first portion of sorbent with a material having a second chemical composition different than the first chemical composition.

4. The system according to claim 1, wherein the first separator includes a first outlet for directing the flue gas and the second portion of sorbent from the first separator, and a second outlet for directing the first portion of sorbent from the first separator, and further comprising:

a reheater configured to heat the flue gas and the second portion of sorbent directed from the first separator, and having a third outlet for directing the heated flue gas and the heated second portion of sorbent from the reheater;

wherein the second portion of sorbent and the flue gas separated by the second separator are the heated second portion of sorbent and the heated flue gas directed from the reheater.

5. The system according to claim 1, wherein:

the absorber includes (i) an absorber inlet for receiving the flow of $SO_2$ laden flue gas, and (ii) an absorber outlet for directing the flue gas and the sorbent with the captured $SO_2$ from the absorber;

the first separator includes (i) a first separator inlet for receiving the flue gas and the sorbent directed from the absorber, (ii) a first separator flue gas outlet for directing the flue gas and the second portion of sorbent from the first separator, and (iii) a first separator sorbent outlet for directing the first portion of sorbent from the first separator; and the second separator includes (i) a second separator inlet, for receiving the flue gas and the second portion of sorbent directed from the first separator, (ii) a second separator flue gas outlet for directing the flue gas from the second separator, and (iii) a second separator sorbent outlet for directing the second portion of sorbent from the second separator.

6. The system according to claim 1, wherein the relative humidity of the sorbent in the absorber is greater than 50%.

7. The system according to claim 1, wherein:

the first separator is a cyclone type separator; and the second separator is one of a baghouse type separator and an electrostatic precipitator type separator.

8. The system according to claim 1, wherein the sorbent includes calcium oxide (CaO).

9. The system according to claim 8, wherein the capture of the $SO_2$ from the flow of the $SO_2$ laden flue gas by the sorbent transforms the CaO to calcium sulfite ($CaSO_3$).

10. The system according to claim 1, wherein:

an average size of sorbent particles in the first portion of sorbent are larger than an average size of sorbent particles in the second portion of sorbent.

11. The system according to claim 1, wherein:

the flow of the $SO_2$ laden flue gas includes flyash; and the flyash includes the sorbent.

12. The system according to claim 1, wherein the first portion of sorbent has a first relative humidity and second portion of sorbent has a second relative humidity lower than the first relative humidity.

13. A method for removing sulfur dioxide ($SO_2$) from $SO_2$ laden flue gas resulting from the burning of fossil fuel, comprising:

capturing $SO_2$ from a flow of the $SO_2$ laden flue gas with a sorbent;

separating a first portion of the sorbent with captured $SO_2$ both from a second portion of the sorbent with captured $SO_2$ and from the flue gas;

separating the second portion of sorbent from the flue gas after separating the first portion of sorbent;

rehydrating the first portion of sorbent after its separation from the second portion of sorbent from the flue gas; and capturing $SO_2$ from another flow of the $SO_2$ laden flue gas with the rehydrated sorbent.

14. The method according to claim 13, further comprising:

also rehydrating the second portion of sorbent after its separation from the flue gas.

15. The method according to claim 13, wherein the first portion of sorbent has a first chemical composition, and further comprising:

combining the first portion of sorbent with a material having a second chemical composition different than the first chemical composition; and rehydrating the combined material having the second chemical composition with the first portion of sorbent.

16. The method according to claim 13, further comprising:

heating the flue gas and the second portion of sorbent, after their separation from the first portion of sorbent;

wherein the second portion of sorbent is separated from the flue gas after the heating of the flue gas and the second portion of sorbent.

17. The method according to claim 13, wherein the relative humidity of the sorbent prior to the capturing of the $SO_2$ from the flow of $SO_2$ laden flue gas is greater than 50%.

18. The method according to claim 13, wherein:

the sorbent includes calcium oxide (CaO); and the capturing of the $SO_2$ from the flow of $SO_2$ laden flue gas transforms the CaO to calcium sulfite ($CaSO_3$).

19. The method according to claim 13, wherein:

an average size of sorbent particles in the first portion of sorbent are larger than an average size of sorbent particles in the second portion of sorbent.

20. The method according to claim 13, wherein the first portion of sorbent has a first relative humidity and second portion of sorbent has a second relative humidity lower than the first relative humidity.

* * * * *